July 11, 1961

T. F. HENEBRY 2,991,687

VISUAL INSPECTION MACHINE

Filed Jan. 31, 1958

INVENTOR.
THOMAS F. HENEBRY
BY
ATTORNEY

INVENTOR.
THOMAS F. HENEBRY
BY
ATTORNEY

United States Patent Office 2,991,687
Patented July 11, 1961

2,991,687
VISUAL INSPECTION MACHINE
Thomas F. Henebry, Bethel, Conn., assignor to Remington Arms Company, Inc., Bridgeport, Conn., a corporation of Delaware
Filed Jan. 31, 1958, Ser. No. 714,008
(Filed under Rule 47(b) and 35 U.S.C. 118)
1 Claim. (Cl. 88—14)

An important aspect of the manufacture of ammunition is that of proper inspection of the product at a number of stages.

This invention is directed to a machine for use in the inspection of ammunition cartridges at the stage of finished case or completed round. The inspection is visually accomplished by a person, the inspector, before whom a series of aligned cartridges or cartridge cases are passed in a continuous and aligned procession. It has been determined that surface defects can be readily detected by the eye by deviations in the uniform pattern of light reflected from the procession of articles or cartridges. Also, missing components may be detected, such as primers, in the case of ammunition.

An object of this invention is to provide a machine which functions to move a procession of aligned articles such as cartridges rapidly through an inspection zone in an improved, effective, continuous, and controllable manner.

Another object is to provide such a machine which can be used to handle series of cartridges, each series being of different size cartridge diameter.

Another object is to cause the optimum speed continuous rotation of individual cartridges in the procession as they are being translated through the inspector zone, which individual rotation can be controlled and varied as to rate and direction. This makes possible the inspection of a wide variety of cartridge sizes in the same machine.

Another object is to provide not only for inspection of the complete side surface of the cartridges but also simultaneous inspection of the ends thereof.

Another object is the provision of a machine which in accomplishing the above objects is itself of relatively simple and of economical construction.

An exact nature of the invention as well as other objects and advantages thereof will more fully appear from a consideration of the following specification, claims, and attached drawings, in which:

Figure 1:
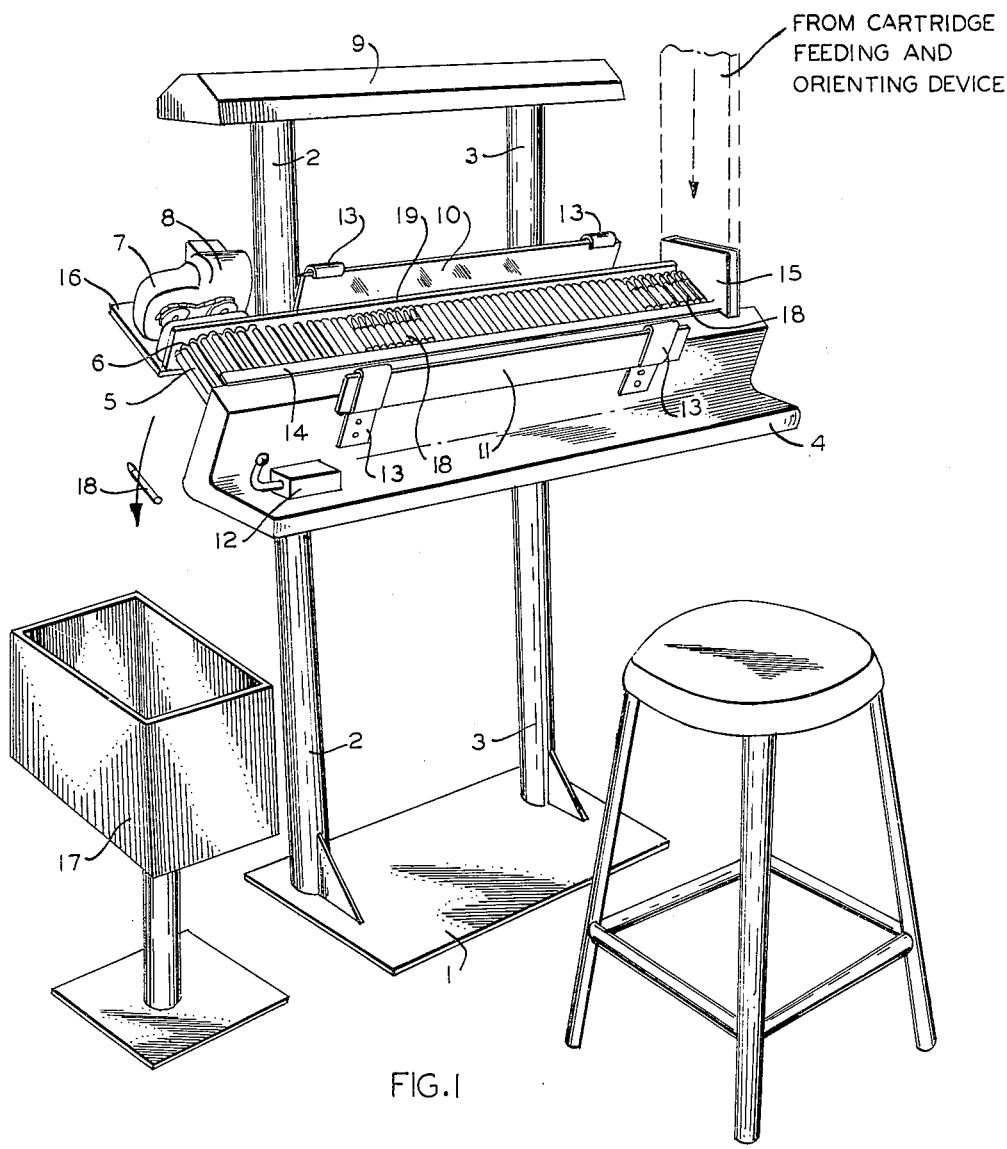
FIG. 1 is an overall perspective view of the entire inspection machine.
Figure 4:
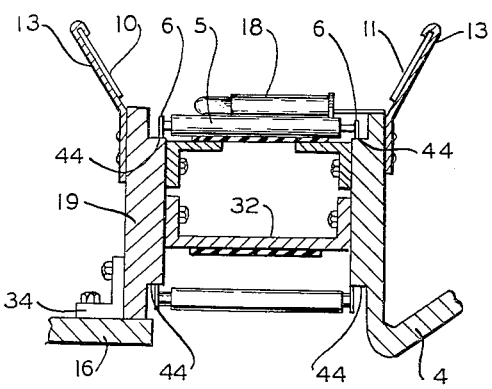
FIG. 4 is a sectional view of the main inspection platform and conveyor taken on the line 2—2 of FIG. 3.

Referring to the drawings, the general arrangement of structure can be seen in FIG. 1. A base element 1 provides support for two vertical supports 2 and 3 on which is supported the inspection device and the illuminating means 9. Two rigidly interconnected parallel horizontal panel members 4 and 19 are securely mounted on the vertical supports 2 and 3 by suitable means not shown. Horizontal panel member 4 consists of two integrally constructed sections, one a flat horizontal shelf-like section and the other an upstanding flat panel section intersecting therewith along a horizontal line with an angle between the two panels of between forty-five and sixty-five degrees, as shown in FIGS. 1 and 4. Spaced from and parallel to the upstanding panel section of member 4 is another horizontal element 19.

Horizontal members 4 and 19 are rigidly interconnected by flanged plate 32 bolted to each, as shown in FIG. 4. Member 19 is secured to vertical support members 2 and 3 by suitable means not shown.

Figure 5:
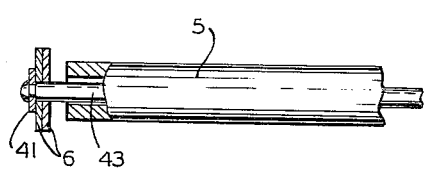
FIG. 5 is a detailed showing of one side of the drive chain and roller arrangement.

And endless conveyor mechanism is mounted in the space between horizontal members 4 and 19. The conveyor consists of a sprocket wheel such as 27 (FIG. 3), mounted at each end of the horizontal assembly on a shaft such as 23 (FIG. 3), perpendicular to the parallel inner plane surfaces of elements 4 and 19. The sprocket wheels engage an endless chain conveyor which consists of two sets of spaced side links 6 connected by transverse pins 43 (FIG. 5), on which pins are rotatably mounted roller elements 5 made of a material such as hard rubber to give the desired frictional quality with respect to the articles carried by the conveyor. The links 6 are held in place on the pins 43 by an annular slot at each end of each pin in which is placed a spring locking ring. The conveyor chain links are guided and supported in their travel in tracks 44 (FIG. 4) in members 4 and 19.

Figure 3:
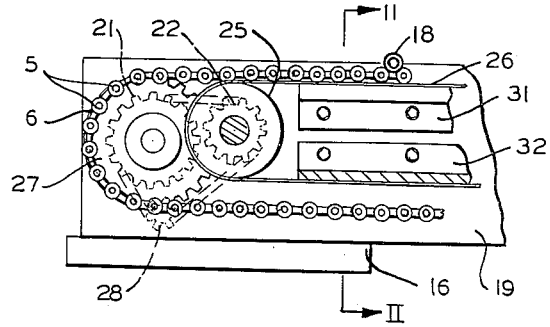
FIG. 3 is a partial sectional view of the endless roller chain drive arrangement together with the endless belt drive arrangement taken on the line 1—1 of FIG. 2.

Underlying the endless roller conveyor is an endless belt 26 mounted on two roller wheels 25 and vertically supported by brackets 31 and 32 (FIG. 3). The rollers 5 of the conveyor engage the belt 26 through the major portion of their horizontal travel. The speed of movement of belt 26 with respect to the speed of the roller conveyor will determine the speed and direction of rotation of the rollers 5 as they are translated along guideways 44 in horizontal members 4 and 19. Due to the differing size of driving elements 27 and 25, the linear speeds of the belt and roller conveyor will differ. It will be seen that tubular objects carried by the roller conveyor will be rotated by reason of the frictional engagement with rollers 5 which themselves are rotated by engagement with belt 26 which may be made of rubberized fabric or other conventional belting material.

Figure 2:
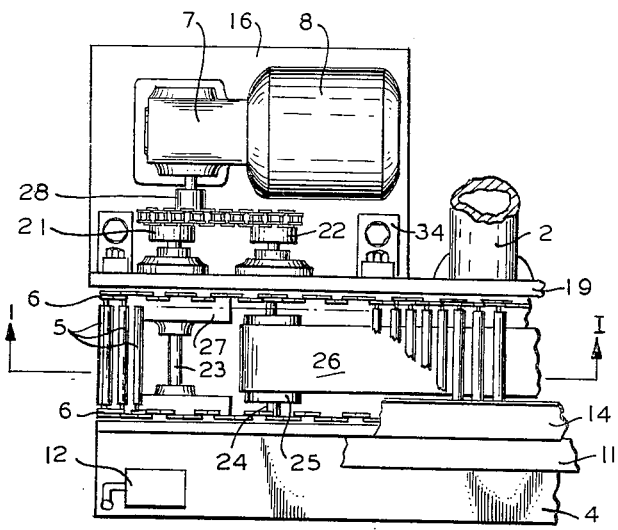
FIG. 2 is a partial plan view of the left side of the machine as shown in FIG. 1, with a portion of the endless roller conveyor broken away to show the underlying endless belt arrangement.

Power drive for both the roller conveyor and the belt is provided by a drive motor 8 mounted on a plate 16 which is rigidly attached to member 19. The motor is of the electric type, controlled by switch 12, in the preferred embodiment shown, and its output drives an attached conventional speed-reducing device 7. The output of device 7 (FIG. 2) drives sprockets 21 and 22 by means of a chain 50. The sprocket 21 is fixedly attached to shaft 23 which rotates sprocket 27 to drive the roller conveyor. Sprocket 22 is fixedly attached to shaft 24 which rotates drive wheel 25 to drive the belt 26. The relative speed of the belt and roller conveyor may be varied by using sprockets of different sizes in place of those shown at 21 and 22 or by disconnecting belt drive sprocket 22 entirely. The size of sprockets 21 and 22 is carefully selected to give the desired speed of rotation of rollers 5 for a given cartridge diameter.

At the right hand side of the machine is a vertical chute 15 which feeds cartridges sequentially on the conveyor. Chute 15 is supplied with oriented cartridges by a conventional orienting and feeding device shown schematically in dotted lines in FIG. 1.

Supported in a horizontal position across vertical supports 2 and 3 is a lamp or light producing device 9 positioned parallel to the conveyor path and directly above it. Elongated strip mirrors 10 and 11 are mounted parallel to the path of conveyor movement on members 4 and 19. The mirrors are positioned to reflect the light from lamp 9 upon the cartridges, especially the ends thereof so that defects or missing components may be more easily detected. The mirrors also make it possible for the inspector to see indirectly the ends of the cartridges in addition to directly viewing the side surfaces thereof.

An elongated guide plate 14 is attached to the upper edge of the upstanding portion of horizontal member 4 to guide the base ends of the cartridges and keep them aligned as they are translated and rotated through the inspection zone.

In operation, the roller conveyor is moving from right to left, as shown in FIG. 1, the conveyor and belt moving at different speeds selected to give the desired rotation of rollers 5. The inspection zone is illuminated by lamp 9 and the inspector is positioned before the machine to view the conveyor from a point substantially perpendicular to the plane of the conveyor. Cartridges of a given type are fed on the conveyor from chute 15 in a continuous aligned procession in which the individual cartridges are rotated as they are carried across the machine by the conveyor. Missing components may be easily detected and surface defects will be readily detected by the deviation in the regular pattern of reflected light from the moving cartridges. Cartridges with defects or missing components are manually removed by the operator inspector. The satisfactory cartridges pass to the end of the conveyor where they drop into suitable receptacles such as 17 for further handling.

It is necessary to provide for varying the speed of rotation of the rollers 5 in order to select the optimum rotational rate for cartridges of varying diameters, as the machine will handle a wide variety of cartridge sizes.

It is apparent that the apparatus disclosed herein may be used for similar inspection of many round tubular objects of similar construction to cartridges. I have illustrated and described a preferred embodiment of my invention but it is to be understood that various modifications and changes could be made therefrom without departing from the spirit of the invention or the scope of the appended claim.

I claim:

A cartridge inspection machine comprising a rigid supporting frame structure, an endless roller conveyor mechanism positioned substantially horizontally on said supporting frame structure for moving a series of laterally aligned cartridges through an inspection zone at a given linear rate, power drive means connected to said endless roller conveyor for actuating the said conveyor, illuminating means and light reflecting means mounted on said frame structure for subjecting the endless roller conveyor to uniform intensity concentrated light as the roller conveyor passes through the inspection zone, a fixed guide means mounted on said conveyor mechanism parallel to the path of conveyor movement for engaging and aligning the ends of cartridges passing through the inspection zone, said endless roller conveyor comprising two laterally spaced drive chains interconnected by a series of crosspins, a series of rollers rotatably mounted one on each crosspin in a position transverse to the endless conveyor motion, and an endless belt also driven by said power drive means at a different selected linear rate and mounted on said support structure in alignment with the roller conveyor and underlying the same in driving engagement with the rollers of the roller conveyor to cause rotation of the individual rollers of the roller conveyor as the rollers are translated through the inspection zone and consequent rotation of the individual cartridges as they are translated by the roller conveyor through the inspection zone, said rotation of the cartridges of the moving series creating a moving uniform pattern of reflected light from said illuminating means, deviations from which provide a rapid visual indication of deviations from the desired surface condition of the cartridges and the absence of a component thereof.

References Cited in the file of this patent

UNITED STATES PATENTS

| | | |
|---|---|---|
| 1,005,335 | Seigle | Oct. 10, 1911 |
| 2,095,502 | Johnston | Oct. 12, 1937 |
| 2,154,844 | Harker et al. | Apr. 18, 1939 |
| 2,354,628 | Whitesell | July 25, 1944 |
| 2,359,165 | Shuman | Sept. 26, 1944 |
| 2,395,620 | Fogle | Feb. 26, 1946 |